United States Patent
DeFreitas et al.

(10) Patent No.: US 10,032,385 B2
(45) Date of Patent: Jul. 24, 2018

(54) SYSTEM FOR OPTIMIZING EMPLOYEE LEADERSHIP TRAINING PROGRAM ENROLLMENT SELECTION

(71) Applicant: Hartford Fire Insurance Company, Hartford, CT (US)

(72) Inventors: Lisa M DeFreitas, Windsor, CT (US); Margaret M Schroeder, Glastonbury, CT (US); Tasha A. Lasane, Vernon, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 214 days.

(21) Appl. No.: 14/670,696

(22) Filed: Mar. 27, 2015

(65) Prior Publication Data

US 2016/0284223 A1    Sep. 29, 2016

(51) Int. Cl.
    *G09B 5/00*     (2006.01)
    *G06Q 10/00*    (2012.01)
    *G06Q 10/10*    (2012.01)
    *G06Q 10/06*    (2012.01)
    *G09B 19/00*    (2006.01)

(52) U.S. Cl.
    CPC ............... *G09B 5/00* (2013.01); *G06Q 10/00* (2013.01); *G06Q 10/06* (2013.01); *G06Q 10/10* (2013.01); *G09B 19/00* (2013.01)

(58) Field of Classification Search
    USPC ........................................................ 434/219
    See application file for complete search history.

(56) References Cited

U.S. PATENT DOCUMENTS

| | | | |
|---|---|---|---|
| 5,743,742 A * | 4/1998 | Morrel-Samuels | B42D 15/004 283/67 |
| 6,587,668 B1 * | 7/2003 | Miller | G09B 5/00 434/350 |
| 7,024,154 B1 * | 4/2006 | Koepper | G09B 5/00 434/118 |
| 7,367,808 B1 | 5/2008 | Frank et al. | |

(Continued)

OTHER PUBLICATIONS

Gao; "Freshman Seminar Assignment Problem"; https://web.archive.org/web/20150218173105/https://www.math.cmu.edu/~aflp/Teaching/OR2/Projects/P42/C.pdf; 2015.*

*Primary Examiner* — Eddy Saint-Vil
*Assistant Examiner* — William Ermlick
(74) *Attorney, Agent, or Firm* — Howard IP Law Group, PC

(57) ABSTRACT

According to some embodiments, information may be retrieved from an employee database that stores, for each of a plurality of employees, a current leadership value and a business unit association. Information about an employee leadership training event may be determined (including a number of slots associated with a first business unit and a number of slots associated with a second business unit), and, based on the information about the employee leadership training event and information in the employee database, including the current leadership values and business unit associations, a subset of the employees may be automatically selected to participate in the employee leadership training event. An indication of the automatically selected subset of employees may then be transmitted to at least one remote device.

16 Claims, 12 Drawing Sheets

(56) References Cited

U.S. PATENT DOCUMENTS

| | | | |
|---|---|---|---|
| 7,558,767 B2* | 7/2009 | Scarborough | G06Q 10/063 |
| | | | 705/321 |
| 7,912,790 B2 | 3/2011 | Albertsson | |
| 8,311,866 B1 | 11/2012 | Benko et al. | |
| 8,628,331 B1 | 1/2014 | Wright | |
| 8,639,634 B2* | 1/2014 | Nelson | G06Q 10/1057 |
| | | | 705/322 |
| 9,501,945 B2* | 11/2016 | Wolf | G06F 17/30699 |
| 2003/0046265 A1* | 3/2003 | Orton | G06Q 10/10 |
| 2003/0167196 A1* | 9/2003 | Khizer | G06Q 30/0203 |
| | | | 705/7.32 |
| 2004/0059785 A1* | 3/2004 | Blume | G06Q 10/109 |
| | | | 709/206 |
| 2004/0225551 A1* | 11/2004 | Hole | G06Q 10/10 |
| | | | 705/500 |
| 2006/0008784 A1 | 1/2006 | Schmincke | |
| 2006/0160059 A1* | 7/2006 | Dompier | G06Q 10/10 |
| | | | 434/362 |
| 2006/0277056 A1* | 12/2006 | Broberg | G06Q 10/10 |
| | | | 705/321 |
| 2007/0203711 A1* | 8/2007 | Nation | G09B 7/00 |
| | | | 434/350 |
| 2008/0059290 A1* | 3/2008 | McFaul | G06Q 10/06 |
| | | | 705/7.14 |
| 2008/0085497 A1 | 4/2008 | Holmes | |
| 2008/0162274 A1* | 7/2008 | Newman | G09B 7/00 |
| | | | 434/219 |
| 2009/0138341 A1* | 5/2009 | Mohan | G06Q 10/06393 |
| | | | 705/7.39 |
| 2009/0187446 A1* | 7/2009 | Dewar | G06Q 10/06311 |
| | | | 706/45 |
| 2009/0276296 A1* | 11/2009 | Spriegel | G06Q 10/00 |
| | | | 705/7.38 |
| 2010/0057659 A1 | 3/2010 | Phelon et al. | |
| 2011/0161139 A1 | 6/2011 | Maheshwari et al. | |
| 2011/0258015 A1 | 10/2011 | Garrigan et al. | |
| 2012/0030128 A1* | 2/2012 | Nelson | G06Q 10/1057 |
| | | | 705/322 |
| 2012/0173295 A1 | 7/2012 | Phelon et al. | |
| 2012/0244500 A1 | 9/2012 | Marinescu et al. | |
| 2014/0106318 A1 | 4/2014 | Wright | |
| 2014/0162235 A1* | 6/2014 | Marra | G06Q 50/01 |
| | | | 434/322 |
| 2014/0170618 A1* | 6/2014 | Bhimavarapu | G09B 19/00 |
| | | | 434/219 |
| 2014/0172474 A1* | 6/2014 | Partridge | G06Q 10/02 |
| | | | 705/5 |
| 2014/0272833 A1* | 9/2014 | Gupta | G06Q 10/10 |
| | | | 434/219 |
| 2015/0019273 A1* | 1/2015 | Grosz | G06Q 10/02 |
| | | | 705/5 |
| 2015/0058148 A1* | 2/2015 | Grosz | G06Q 30/0269 |
| | | | 705/26.2 |
| 2015/0248739 A1* | 9/2015 | Schulman | G06Q 50/2053 |
| | | | 434/322 |
| 2015/0302335 A1* | 10/2015 | Unda | G06Q 10/06393 |
| | | | 705/7.39 |
| 2016/0171423 A1* | 6/2016 | El-Shishiny | G06Q 10/06311 |
| | | | 705/7.17 |
| 2016/0247072 A1* | 8/2016 | Auger | G06F 17/30 |

* cited by examiner

300

Browser by Worldscape

Employee_database_information

| EMPLOYEE INFORMATION 310 | | LEADERSHIP LEVEL 320 | TRAINING EVENT 330 | STATUS 340 |
|---|---|---|---|---|
| NAME | EMAIL | | | |
| SALLY ADAMS | SA@X.COM | T3 | CLASS_01 | ENROLLED |
| JOHN DOE | JD@X.COM | T5 | ONLINE_12 | INVITED |
| LIZ GILMORE | LG@X.COM | T5 | LUNCHEON_1 | ENROLLED |
| SAM HIGGIS | SH@X.COM | T9 | NONE | N/A |

*FIG. 3*

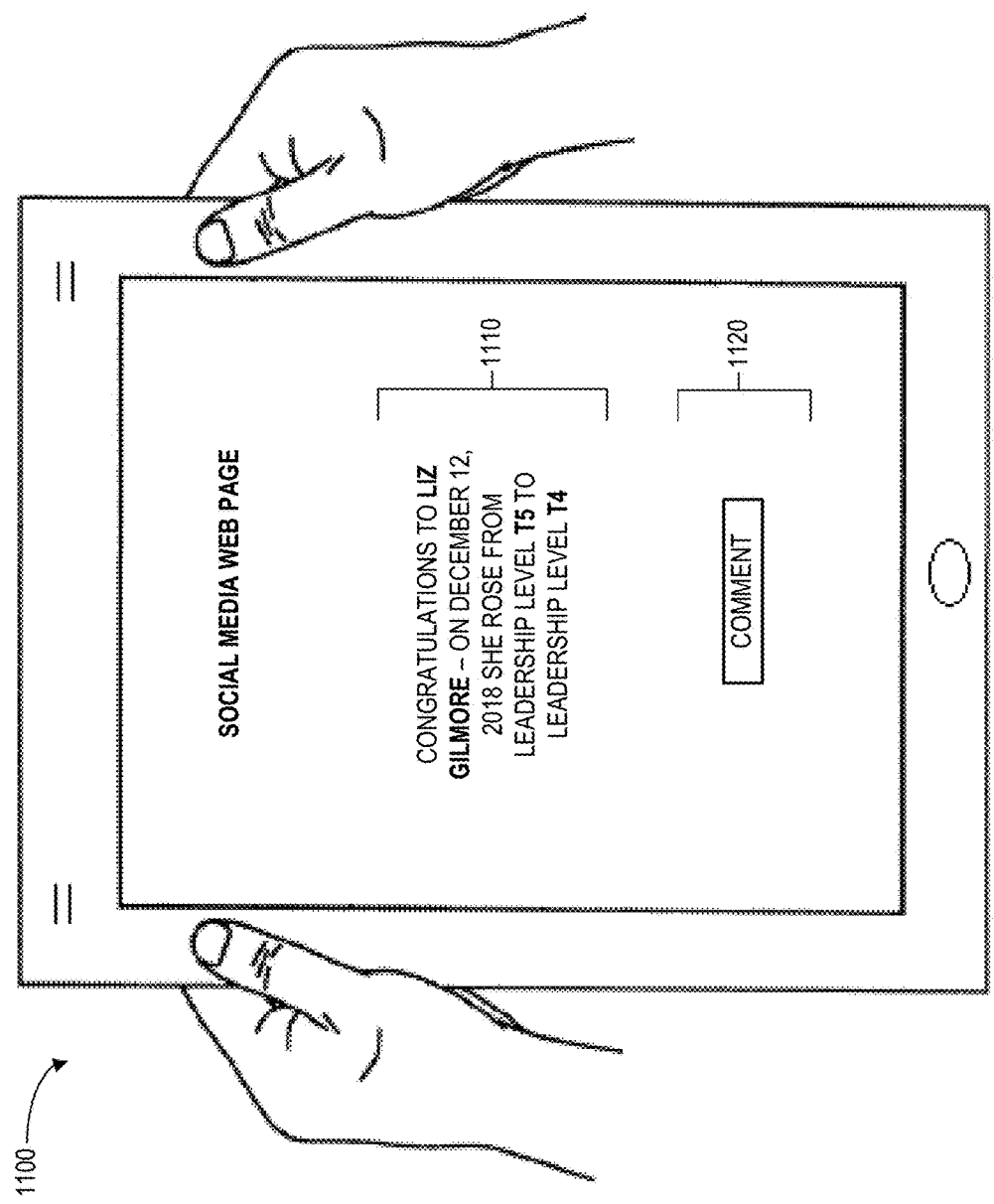

SYSTEM FOR OPTIMIZING EMPLOYEE LEADERSHIP TRAINING PROGRAM ENROLLMENT SELECTION

FIELD

The present invention relates to computer systems and, more particularly, to computer systems that administer an employee leadership training program.

BACKGROUND

An enterprise will often encourage employees to become more effective leaders. The inherent value of leadership development may be a key foundation to help enact the mission, vision, values, and/or goals of the enterprise. Moreover, a leadership development program may seek to be fully aligned with the strategic plan of the organization and reflect a long-range commitment of all level of leaders at the enterprise. The program may strive to be competency-based with measurable outcomes and appropriate diagnostic measures.

In some cases, however, an enterprise may need more capability, consistency, and ownership at the leadership level. For example, the enterprise may lack consistent examples of what quality leadership looks like in action, resulting in a high degree of variability in leadership styles and behavior and an inconsistent experience for employees. Senior leaders may lack engagement and confidence in the future of the enterprise. Fragmented leadership development programs and inconsistent deployment across the organization may further these problems. While leadership training can be given to employees to address such issues, determining which employees should receive this type of training can be a difficult task, especially when there are a substantial number of employees and/or a number of different levels of leadership experience. For example, the decision to provide such training will typically be based on information from a number of disparate systems that may not be able to communicate with each other. Such systems may include, for example, human resource databases, training program systems and modules, paper files, manager surveys, real world interactions with actual customers, etc. As a result, it can be difficult to properly gather and review the appropriate information to make an informed decision. It would therefore be desirable to provide systems and methods to facilitate administration of an employee leadership training program in an automated, efficient, and accurate manner.

SUMMARY

According to some embodiments, systems, methods, apparatus, computer program code and means may facilitate administration of an employee leadership training program. In some embodiments, information may be retrieved from an employee database that stores, for each of a plurality of employees, a current leadership value and a business unit association. Information about an employee leadership training event may be determined (including a number of slots associated with a first business unit and a number of slots associated with a second business unit), and, based on the information about the employee leadership training event and information in the employee database, including the current leadership values and business unit associations, a subset of the employees may be automatically selected to participate in the employee leadership training event. An indication of the automatically selected subset of employees may then be transmitted to at least one remote device.

Some embodiments provide: means for retrieving information from an employee database that stores, for each of a plurality of employees, a current leadership value and a business unit association; means for determining information about an employee leadership training event (including a number of slots associated with a first business unit and a number of slots associated with a second business unit); based on the information about the employee leadership training event and information in the employee database, including the current leadership values and business unit associations, means for automatically selecting a subset of the employees to participate in the employee leadership training event; and means for transmitting to at least one remote device an indication of the automatically selected subset of employees.

A technical effect of some embodiments of the invention is an improved and computerized method to facilitate administration of an employee leadership training program. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3 illustrates an employee database display in accordance with some embodiments.

FIG. 11 illustrates a handheld social media display according to some embodiments.

DETAILED DESCRIPTION

Figure 1A:
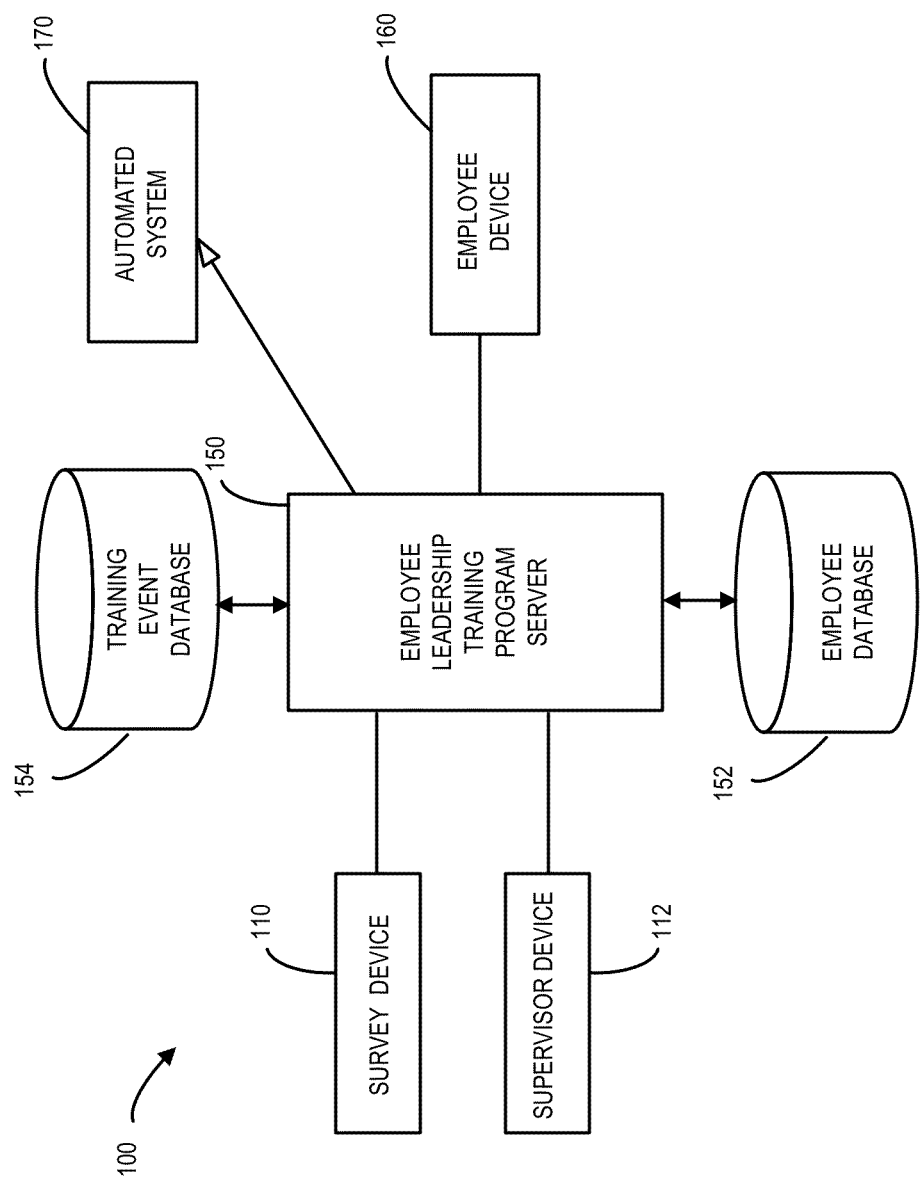
FIG. 1A is block diagram of a system according to some embodiments of the present invention.

Leadership training can be given to employees over a period of time to improve the performance of an enterprise. Determining which employees should receive this type of training can be a difficult task, especially when there are a substantial number of employees and/or a number of different levels of leadership experience. For example, the decision to provide such training will typically be based on information from a number of disparate systems that may not be able to communicate with each other. Such systems may include, for example, human resource databases, training program systems and modules, paper files, manager surveys, real world interactions with actual customers, etc. As a result, it can be difficult to properly gather and review the appropriate information to make an informed decision. It would therefore be desirable to provide systems and methods to facilitate administration of an employee leadership training program in an automated, efficient, and accurate manner. FIG. 1A is block diagram of a system 100 according to some embodiments of the present invention. In particular, the system 100 includes an employee leadership training program server 150 that may exchange information with a survey device 110 (e.g., that provides information about employees, managers, training program events, etc.), a supervisor device 112, and/or an employee device 160.

The training program server 150 may, according to some embodiments, automatically recommend employees who should receive leadership training (and what types of leadership training events might be most appropriate for those employees). For example, a list of employees who should attend a "Providing Everyday Service Excellence" presentation might be output from the training program server 150 to the supervisor device 112. According to some embodiments, such a list may be provided in priority order (e.g., with those at the beginning of the list being most likely to benefit from the leadership training event). Note that such recommendations might also be transmitted directly to the employee device 160 (e.g., by displaying the appropriate information on an employee portal). According to some embodiments, information about employees is retrieved from an employee database 152 and information about leadership training events may be exchanged with a training event database 154.

The training program server 150, survey device 110, supervisor device 112, and/or employee device 160 might be, for example, associated with a Personal Computer (PC), laptop computer, an enterprise server, a server farm, an Enterprise Resource Management ("ERM") application, and/or a database or similar storage devices. The training program server 150 may, according to some embodiments, be associated with an insurance provider.

According to some embodiments, an "automated" training program server 150 may facilitate administration of an employee leadership training program. As used herein, the term "automated" may refer to, for example, actions that can be performed with little (or no) intervention by a human.

As used herein, devices, including those associated with the training program server 150 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The training program server 150 may store information into and/or retrieve information from the employee database 152. The employee database 152 might be associated with, for example, an insurance company or human resources department and might also store data associated with past and current performance reviews, leadership values, etc. The employee database 152 may be locally stored or reside remote from the training program server 150. As will be described further below, the employee database 152 may be used by the training program server 150 to generate leadership training program recommendations. According to some embodiments, the training program server 150 communicates information about training events to an automated system 170, such as by transmitting an electronic file to a human resources device, a web portal platform, an email server, a social media platform, a workflow management system, etc.

Although a single training program server 150 is shown in FIG. 1A, any number of such devices may be included. Moreover, various devices described herein might be combined according to embodiments of the present invention. For example, in some embodiments, the training program server 150 and employee database 152 might be co-located and/or may comprise a single apparatus.

Figure 1B:
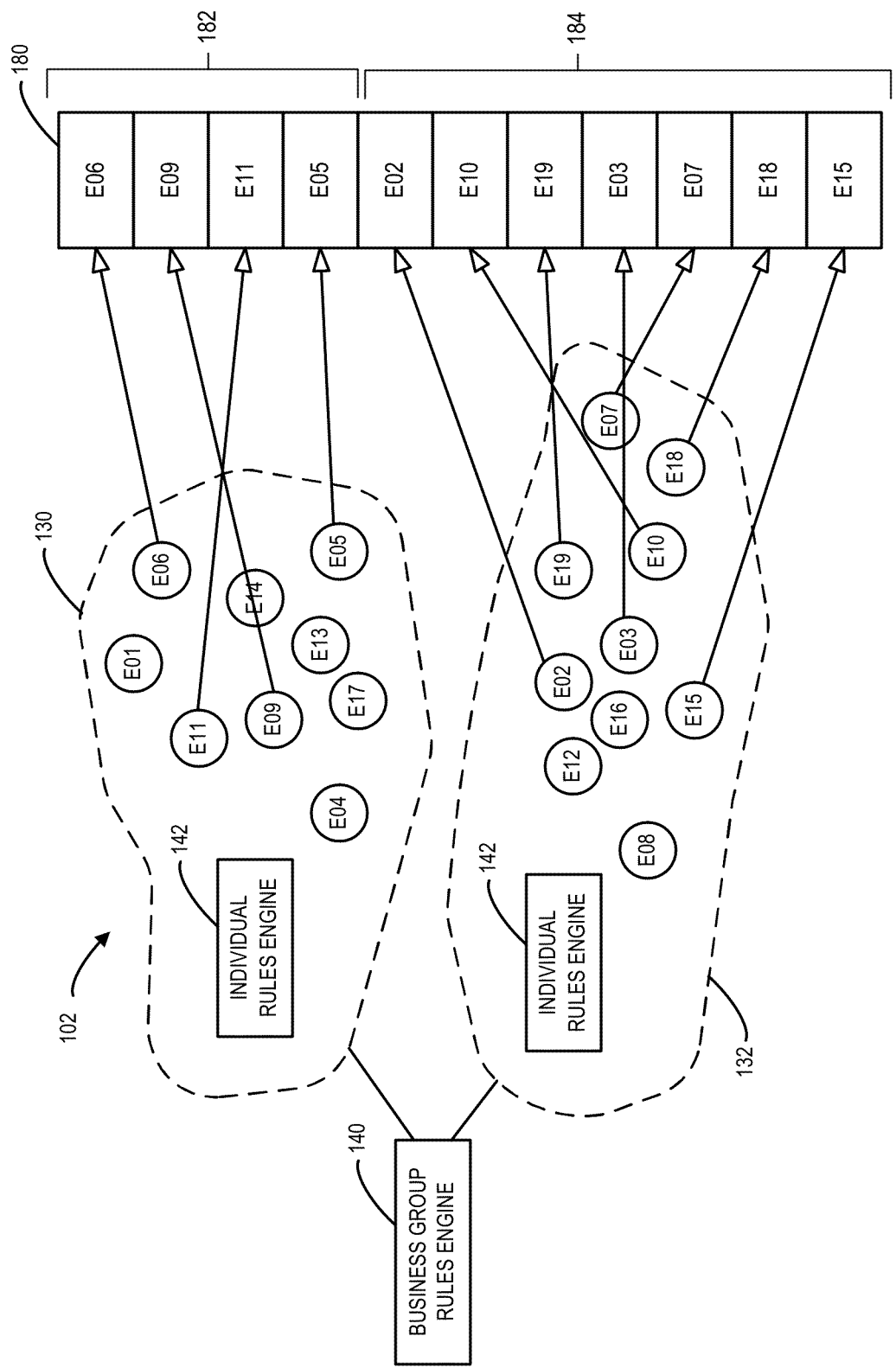
FIG. 1B is a block diagram of an insurance enterprise in accordance with some embodiments.

The elements of FIG. 1A may be used to automatically select employees for leadership training events. For example, FIG. 1B is a block diagram of an insurance enterprise 102 in accordance with some embodiments described herein. In particular, the enterprise 102 has a set of nine employees associated with a first business unit 130 and a set of ten employees associated with a second business unit 132. For example, the nine employees might work in a Human Resources ("HR") while the ten employees work in a sales office. Although two business units 130, 132 are illustrated in FIG. 1B, note that any number of units might be associated with the insurance enterprise 102. Moreover, according to some embodiments, a single employee might be associated with multiple business units (e.g., the regions of the business units 130, 132 might overlap). Although the location of the employees in FIG. 1B is arbitrary, according to some embodiments the position of an employee might be based at least in part on seniority, a current leadership value, etc.

The insurance enterprise 102 also includes an employee leadership training event 180 having eleven available slots (e.g., eleven different employees can attend the event 180 at the same time). Note that, according to some embodiments, different slots may be associated with different business units 130, 132. In the example of FIG. 1B, a business group rules engine 140 has automatically calculated that a first set of four slots 182 is to be associated with the first business unit 130 and a second set of seven slots 184 is to be associated with the second business unit 132. Within each business unit 130, 132, an individual rules engine 142 may be used to assign employees to available slots. For example, the individual rules engine 142 of the first business unit 130 has assigned E06, E09, E11 and E05 to the first set of slots 182. Note that according to some embodiments, slots may be assigned in priority order (e.g., with higher slots being given higher importance). Further note that the business group rules engine 140 and/or individual rules engines 142 may assign slots in accordance with any of a number of different techniques. For example, a business unit or employee might be given a multiplier rate (making slot assignment more likely or less likely). Still further, note that different business units and/or employees might be associated with different types of business rules and/or slot assignment logic.

Figure 2:
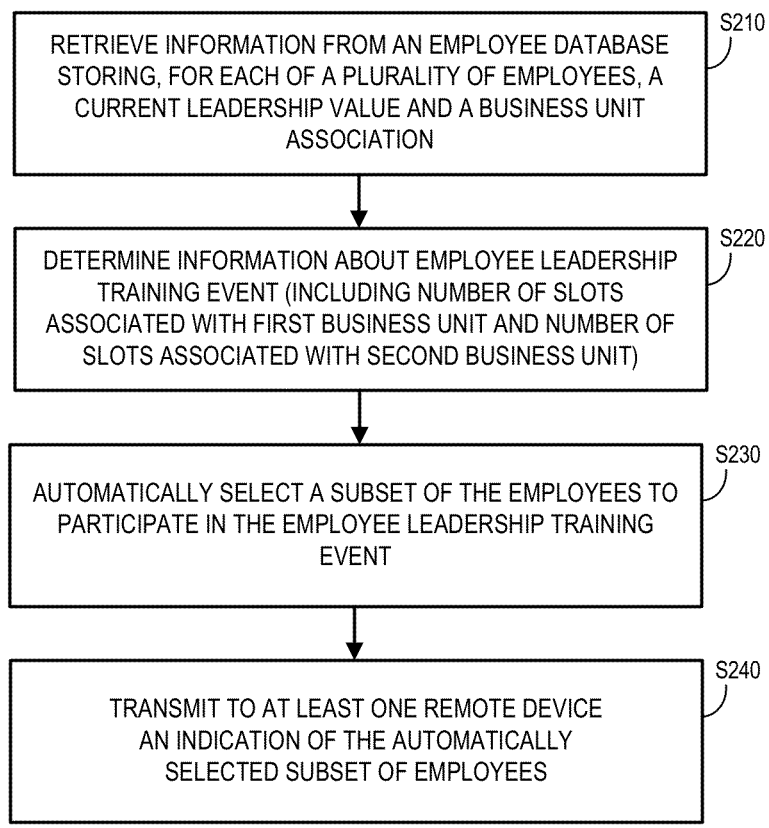
FIG. 2 illustrates a method that might be performed in accordance with some embodiments.

FIG. 2 illustrates a method that might be performed by some or all of the elements of the system 100 described with respect to FIG. 1A, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, information may be retrieved from an employee database that stores information about a plurality of employees, including, for each employee, a current leadership value and business unit association. The current leadership value might comprise, for example, a leadership ranking from "T9" (the least experienced type of leader) to "T1" (someone who is already a senior leader within the enterprise). According to some embodiments, the current leadership value might comprise, or be associated with, a leadership description, such as: (i) an individual contributor (e.g., the least experienced level of leader), (ii) an emerging leader, (iii) a leader, (iv) a high potential leader, (v) an experienced leader, (vi) an accelerated successor, and/or (vii) a senior leader (e.g., the most experienced level of leader). The business unit association might indicate, for example, that the employee works in an HR department, sales operation, insurance claims handling office, etc. According to some embodiments, a single employee might be associated with several different business units.

At S220, information about an employee leadership training event may be determined (including a number of slots associated with a first business unit and a number of slots associated with a second business unit). As used herein, the phrase "leadership training event" may refer to any program or initiative that may be used to improve employee leadership characteristic, including, for example: (i) a presentation, (ii) classroom based learning, (iii) a test, (iv) a coaching opportunity, (v) a mentoring program, (vi) a project-based learning opportunity, and/or (vii) an online simulation training module. The word "slots" might refer to, for example, a number of employees who can simultaneously attend a training event (based on a number of physical seats, logins to a virtual classroom, etc.).

Based on the information about the employee leadership training event and information in the employee database, including the current leadership values and business unit associations, at S230 a subset of the employees may be automatically selected to participate in the employee leadership training event. At S240, an indication of the automatically selected subset of employees may be transmitted to at least one remote device. For example, the transmitted indication might comprise: (i) invitations, to the subset of employees, to participate in the employee leadership training event, (ii) automatic enrollment of the subset of employees in the employee leadership training event (e.g., in which case each employee may need to opt-out of the training event if desired), and/or (iii) recommendations to managers of the subset of employees (e.g., who can then review the recommendations and decide whether or not each employee should attend the leadership training event). Although some embodiments describe an automatic generation of a list of attendees for a leadership training event, other embodiments may instead automatically generate a list of employees who should not attend a particular leadership training event.

The automatic selection of the subset of employees might be based on, for example, supervisor survey information (e.g., does the employee's manager think he or she is ready for the training?) and/or supervised survey information (e.g., do the people who are managed by the employee think he or she is ready for advancement in the leadership program?). According to some embodiments, selection of a first employee to be included in the subset of employees is based at least in part on information about other employees. For example, it might be desired to have 25% of all salespeople participate in a particular leadership training event. In this case, the current participation of other employees might increase or decrease the likelihood that a particular salesperson is recommended for a training event. Note that many other factors might be considered when selecting the subset of employees, including, for example: (i) a length of employment, (ii) a job title, (iii) a job description, (iv) a survey completed by the employee, (v) customer survey information, (vi) a geographical location (e.g., does the employee work in NY, NJ or CT), (vii) an office of an enterprise, (viii) time information (e.g., is this an unusually busy time of year for the employee), (ix) a prior employee training event, (x) an employee training event request (e.g., perhaps the employee requested to be invited to certain types of training events), (xi) prior training experience (e.g., if the employee had already completed some courses while working for a prior employer), (xii) potential training program conflicts (e.g., to avoid enrolling a single employee in two different training programs on the same day, during a single fiscal quarter, etc.), and/or (xiii) an overall talent potential profile.

According to some embodiments, the system may apply business logic to the automatically selected subset of employees to determine: (i) a first group to automatically receive invitations to participate in a second employee leadership training event, and (ii) a second group to be automatically enrolled the second employee leadership training event. Because the logic is only applied to the subset of employees, the efficiency of the system may be improved. According to some embodiments, the system may be further configured to automatically transmit information about the subset of employees to: (i) an email server (e.g., to send notifications to employees, managers, and/or people hosting a training event), (ii) a workflow application, (iii) a report generator, (iv) a social media server, and/or (v) a calendar application (e.g., to place the event on the employees calendar application).

FIG. 3 illustrates an employee database display 300 in accordance with some embodiments. The display 300 provides information about employees 310 who may, or may not, be recommended to receive various types of leadership training. The information 310 illustrated in FIG. 3 is only one example, including a name and a contact email, but displays 300 may include other types of data. In the example of FIG. 3, a leadership level 320 may indicate a current leadership status of the employee (e.g., from T9 to T1). The information 310 may further include one or more training events 330 recommended for each employee and/or a status 340 (e.g., whether he or she is invited to or enrolled in the event, has already completed the event, etc.). Other types of employee information 310 that might be provided on the display include a manager identifier and/or contact information, a geographic office, a job description, etc.

Figure 4:
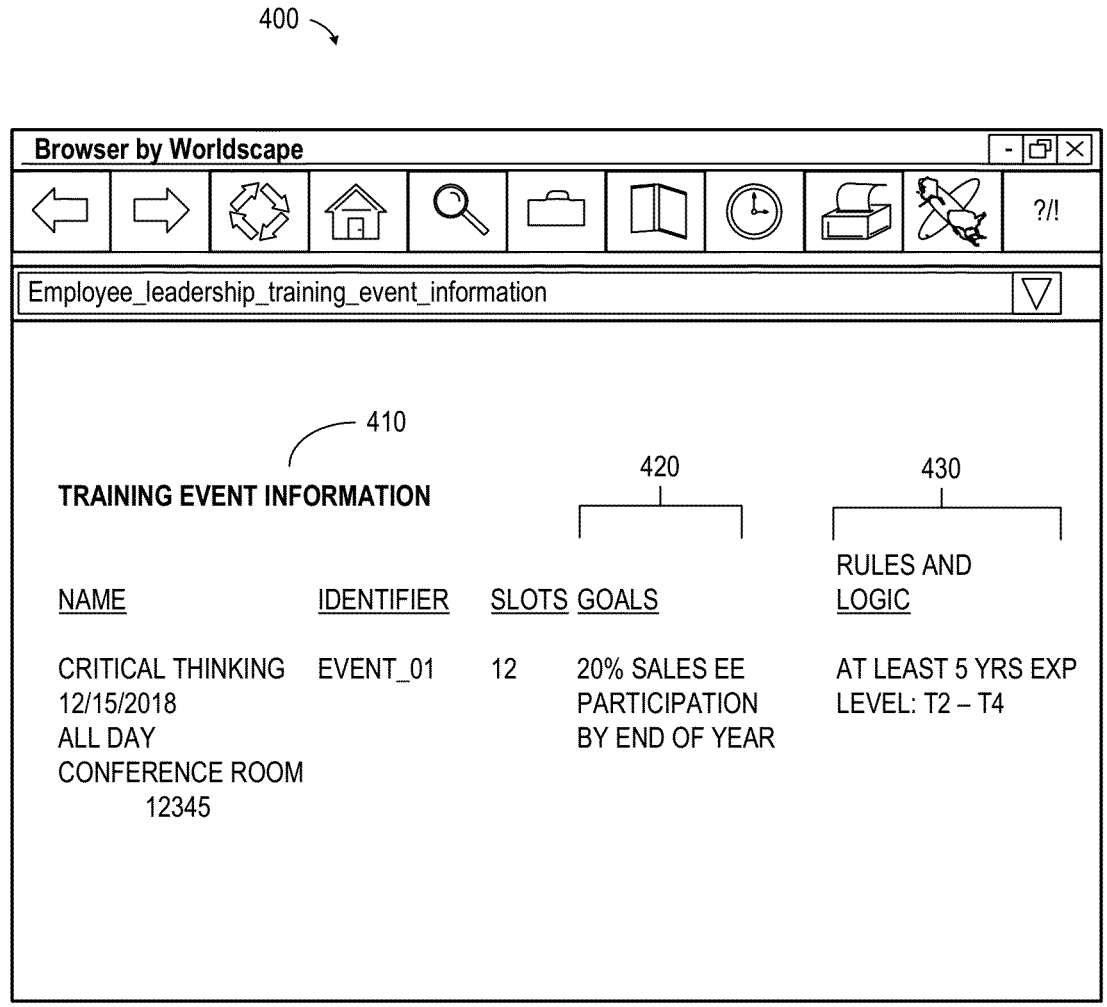
FIG. 4 illustrates an employee leadership training event display according to some embodiments.

FIG. 4 illustrates an employee leadership training event display 400 according to some embodiments. The display 400 provides information about leadership training events 410 that may, or may not, be recommended for various employees. The information 410 illustrated in FIG. 4 is only one example, including a name, an identifier, and a number of available slots (e.g., indicating how many employees can attend the event) but displays 400 may include other types of data. In the example of FIG. 4, goals 420 for the training event or program may indicate a level of desired participation by certain types of employees. The information 410 may further include rules and/or logic 430 that may be applied when selecting employees to attend the event (e.g., based on seniority and/or a current leadership level of each employee). Other types of training event information 410 that might be provided on the display include a link to training materials, a description of the event, etc.

Figure 5:
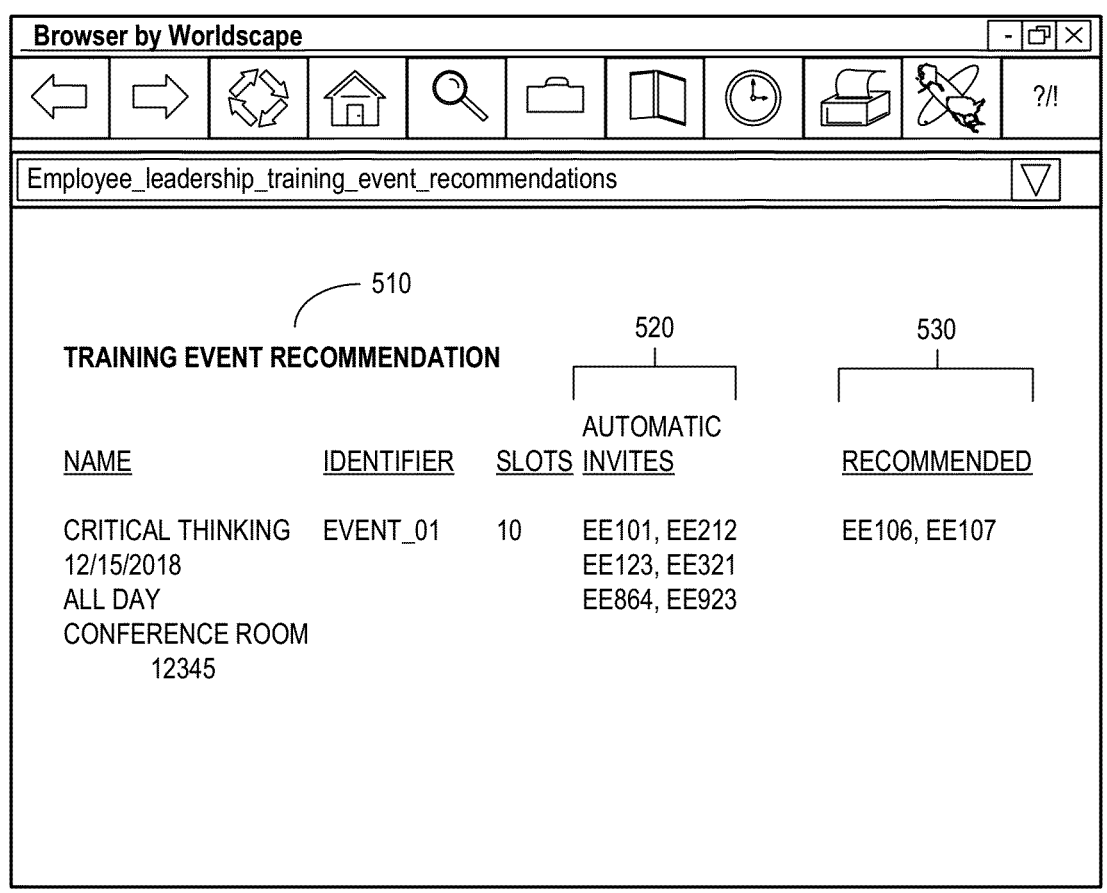
FIG. 5 illustrates a training event recommendations display in accordance with another embodiment.

FIG. 5 illustrates a training event recommendations display 500 in accordance with another embodiment. The display 500 provides recommendations for leadership training events 510. The information 510 illustrated in FIG. 5 is only one example, including a name, an identifier, and a number of available slots (e.g., indicating how many employees can attend the event) but displays 500 may include other types of data. In the example of FIG. 5, a list of employee identifiers who are recommended to receive automatic invites 520 is provided. The information 510 may further include a list of employees being recommended to attend the event (but who are not being automatically invited). A manager might then review those recommendations 530 and decide who will actually attend the event. Other types of recommendation information 510 that might be provided on the display 500 include one or more reasons why an employee was (or was not) recommended, etc.

Figure 6:
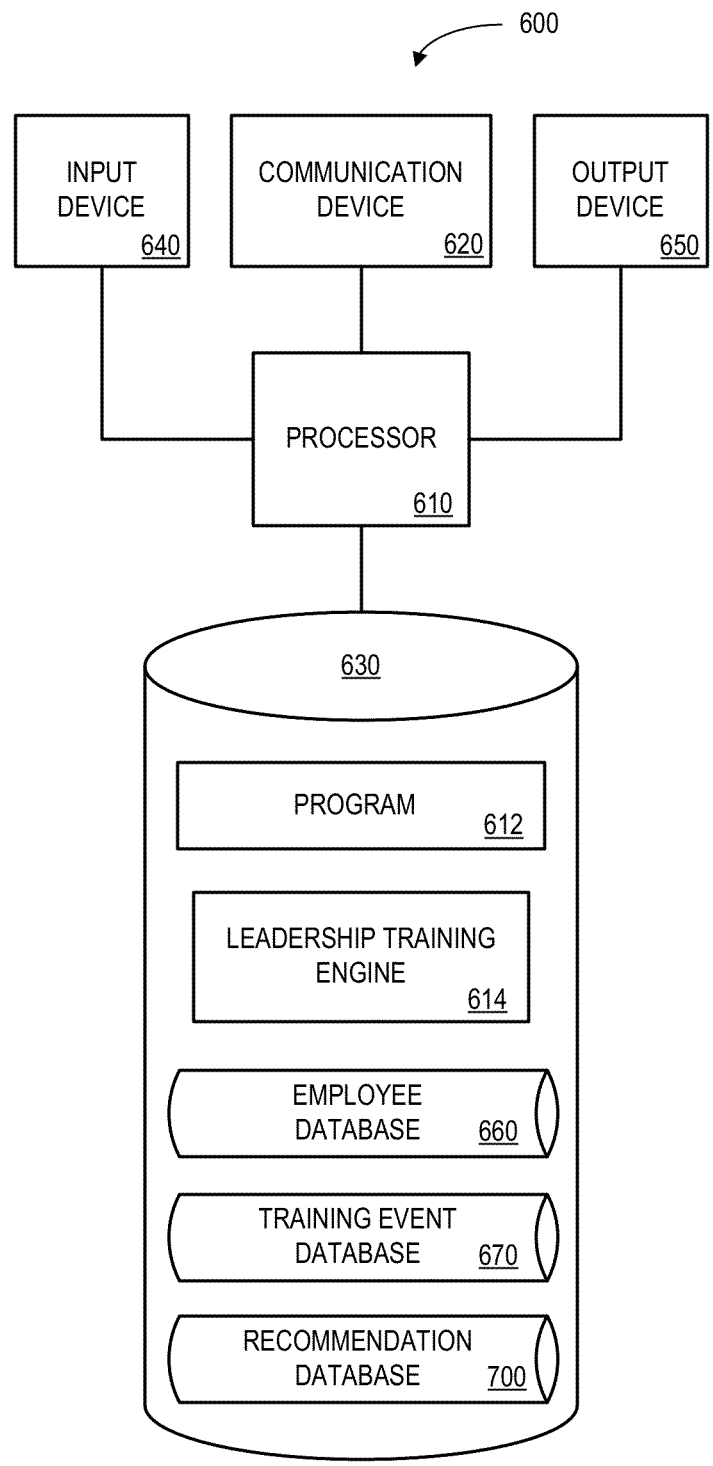
FIG. 6 is block diagram of an employee leadership training program tool or platform according to some embodiments of the present invention.

The embodiments described herein may be implemented using any number of different hardware configurations. For example, FIG. 6 illustrates a leadership training program platform 600 that may be, for example, associated with the training program server 150 of the system 100 of FIG. 1A. The leadership training program platform 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote manager, survey, and/or employee devices. The leadership training program platform 600 further includes an input device 640 (e.g., a mouse and/or keyboard to enter information about training event requirements or employee characteristics) and an output device 650 (e.g., to output reports regarding overall leadership goals and current statuses).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or a leadership training engine or application 614 for controlling the processor 610. The processor 610 performs instructions of the programs 612, 614, and thereby operates in accordance with any of the embodiments described herein. For example, the processor 610 may retrieve information from an employee database that stores, for each of a plurality of employees, a current leadership value and a business unit association. Information about an employee leadership training event (including a number of slots associated with a first business unit and a number of slots associated with a second business unit) may be determined by the processor 610, and, based on the information about the employee leadership training event and information in the employee database, including the current leadership values and business unit associations, a subset of the employees may be automatically selected by the processor 610 to participate in the employee leadership training event. An indication of the automatically selected subset of employees may then be transmitted by the processor 610 to at least one remote device.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the leadership training program platform 600 from another device; or (ii) a software application or module within the leadership training program platform 600 from another software application, module, or any other source.

In some embodiments (such as shown in FIG. 6), the storage device 630 further includes an employee database 660 (e.g., associated with an employee's performance, customer surveys, etc.), a training event database 670 (e.g., providing goals, rules, etc. for training programs), and a recommendation database 700 (e.g., indicating which employees should attend which events). An example of a database that may be used in connection with the leadership training program platform 600 will now be described in detail with respect to FIG. 7. Note that the database described herein is only one example, and additional and/or different information may be stored therein. Moreover, various databases might be split or combined in accordance with any of the embodiments described herein. For example, the recommendation database 700 and/or employee database 660 might be combined and/or linked to each other within the leadership training engine 614.

Figure 7:
FIG. 7 is a tabular portion of a recommendation database according to some embodiments.

Referring to FIG. 7, a table is shown that represents the recommendation database 700 that may be stored at the leadership training program platform 600 according to some embodiments. The table may include, for example, entries identifying recommendations for leadership training events. The table may also define fields 702, 704, 706, 708, 710 for each of the entries. The fields 702, 704, 706, 708, 710 may, according to some embodiments, specify: an event identifier 702, event details 704, a number of slots 706, automatic invites 708, and recommended employees 710. The recommendation database 700 may be created and updated, for example, based on information electrically received from employee devices, manager devices, survey devices, and/or leadership training counselors of an insurance enterprise.

The event identifier 702 may be, for example, a unique alphanumeric code identifying a leadership training event that is being presented or hosted by an enterprise (or by a third party) for employees. The event details 704 may describe, for example, what the event intends to achieve, where and when the event will occur, etc. The number of slots 706 may indicate a total number of employees that may attend the event. The automatic invites 708 may represent a list of employee identifiers who are recommended to receive automatic invites to the event. The recommended employees 710 may comprise a list of employees being recommended to attend the event (but who are not being automatically invited). A manager might then review those recommendations 710 and decide who will actually attend the event. Other types of recommendation information that might be stored in the database 700 include one or more reasons why an employee was (or was not) recommended, etc.

Figure 8:
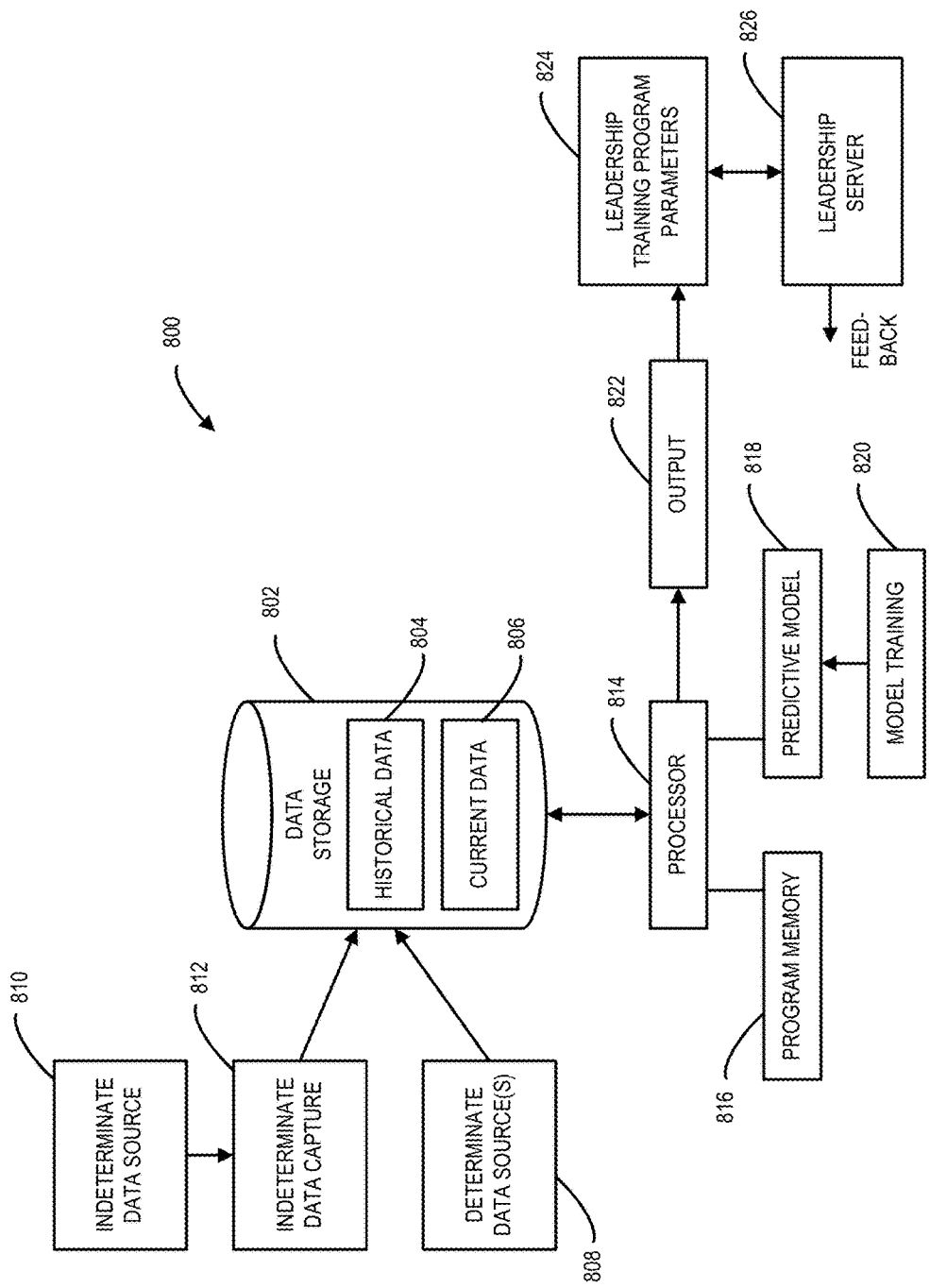
FIG. 8 is a partially functional block diagram that illustrates aspects of a computer system provided in accordance with some embodiments of the invention.

The recommendations in the recommendation database 700 may, according to some embodiments, be based at least in part on one or more predictive leadership models. For example, one or more predictive models may analyze historic leadership training data to generate training event requirements, recommendations, decisions, etc. Features of some embodiments associated with a predictive model will now be described by first referring to FIG. 8. FIG. 8 is a partially functional block diagram that illustrates aspects of a computer system 800 provided in accordance with some embodiments of the invention. For present purposes it will be assumed that the computer system 800 is operated by an insurance company (not separately shown) for the purpose of providing employee leadership training information to an event server, workflows, and/or employees as appropriate.

The computer system 800 includes a data storage module 802. In terms of its hardware the data storage module 802 may be conventional, and may be composed, for example, by one or more magnetic hard disk drives. A function performed by the data storage module 802 in the computer system 800 is to receive, store and provide access to both historical transaction data (reference numeral 804) and current transaction data (reference numeral 806). As described in more detail below, the historical transaction data 804 is employed to train a predictive model to provide an output that indicates employee leadership training parameters, and the current transaction data 806 is thereafter analyzed by the predictive model. Moreover, as time goes by, and results become known from processing current transactions, at least some of the current transactions may be used to perform further training of the predictive model. Consequently, the predictive model may thereby adapt itself to changing employee leadership training parameter patterns (e.g., a particular employee leadership training program might become more difficult to attend as time progresses).

Either the historical transaction data 804 or the current transaction data 806 might include, according to some embodiments, determinate and indeterminate data. As used herein and in the appended claims, "determinate data" refers to verifiable facts such as the a customer name of an individual or of a business or other entity; a type of customer interaction; a time of day; a day of the week; a geographic location; etc.

As used herein, "indeterminate data" refers to data or other information that is not in a predetermined format and/or location in a data record or data form. Examples of indeterminate data include narrative speech or text during a customer telephone interaction or job performance review, information in descriptive notes fields and signal characteristics in audible voice data files. Indeterminate data extracted from social media posts might be associated with, for example, an amount of customer or manager satisfaction with an employee.

The determinate data may come from one or more determinate data sources 808 that are included in the computer system 800 and are coupled to the data storage module 802. The determinate data may include "hard" data and one possible source of the determinate data may be the insurance company's databases (not separately indicated). Another possible source of determinate data may be from data entry by the insurance company's administrative personnel.

The indeterminate data may originate from one or more indeterminate data sources 810, and may be extracted from raw files or the like by one or more indeterminate data capture modules 812. Both the indeterminate data source(s) 810 and the indeterminate data capture module(s) 812 may be included in the computer system 800 and coupled directly or indirectly to the data storage module 802. Examples of the indeterminate data source(s) 810 may include data storage facilities for document images, for text files (e.g., email interactions and performance reviews) and digitized recorded voice files (e.g., telephone calls). Examples of the indeterminate data capture module(s) 812 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, supervisor opinions may be extracted from their email messages.

The computer system 800 also may include a computer processor 814. The computer processor 814 may include one or more conventional microprocessors and may operate to execute programmed instructions to provide functionality as described herein. Among other functions, the computer processor 814 may store and retrieve historical transaction data 804 and current transaction data 806 in and from the data storage module 802. Thus the computer processor 814 may be coupled to the data storage module 802.

The computer system 800 may further include a program memory 816 that is coupled to the computer processor 814. The program memory 816 may include one or more fixed storage devices, such as one or more hard disk drives, and one or more volatile storage devices, such as RAM devices. The program memory 816 may be at least partially integrated with the data storage module 802. The program memory 816 may store one or more application programs, an operating system, device drivers, etc., all of which may contain program instruction steps for execution by the computer processor 814.

The computer system 800 further includes a predictive model component 818. In certain practical embodiments of the computer system 800, the predictive model component 818 may effectively be implemented via the computer processor 814, one or more application programs stored in the program memory 816, and data stored as a result of training operations based on the historical transaction data 804 (and possibly also data received from a third party service). In some embodiments, data arising from model training may be stored in the data storage module 802, or in a separate data store (not separately shown). A function of the predictive model component 818 may be to determine appropriate program administration processes. The predictive model component may be directly or indirectly coupled to the data storage module 802.

The predictive model component 818 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 800 includes a model training component 820. The model training component 820 may be coupled to the computer processor 814 (directly or indirectly) and may have the function of training the predictive model component 818 based on the historical transaction data 804 and/or program information. (As will be understood from previous discussion, the model training component 820 may further train the predictive model component 818 as further relevant data becomes available.) The model training component 820 may be embodied at least in part by the computer processor 814 and one or more application programs stored in the program memory 816. Thus the training of the predictive model component 818 by the model training component 820 may occur in accordance with program instructions stored in the program memory 816 and executed by the computer processor 814.

In addition, the computer system 800 may include an output device 822. The output device 822 may be coupled to the computer processor 814. A function of the output device 822 may be to provide an output that is indicative of (as determined by the trained predictive model component 818) particular program information. The output may be generated by the computer processor 814 in accordance with program instructions stored in the program memory 816 and executed by the computer processor 814. More specifically, the output may be generated by the computer processor 814 in response to applying the data for the current transaction to the trained predictive model component 818. The output may, for example, be a list of employee identifiers, a true/false flag, or a number within a predetermined range of numbers. In some embodiments, the output device may be implemented by a suitable program or program module executed by the computer processor 814 in response to operation of the predictive model component 818.

Still further, the computer system 800 may include employee leadership training parameters 824. The employee leadership training parameters 824 may be implemented in some embodiments by a software module executed by the computer processor 814. The employee leadership training parameters 824 may have the function of directing workflow based on the output from the output device 822. Thus, the employee leadership training parameters 824 may be coupled, at least functionally, to the output device 822. In some embodiments, for example, the employee leadership training parameters 824 may direct workflow by referring, to a leadership server 826 or suitable platform, current transactions analyzed by the predictive model component 818 and found to be associated with various employee leadership training decisions. In some embodiments, the leadership server 826 may be a part of the insurance company that operates the computer system 800. Feedback information from the leadership server may be output and used to refine the performance of the predictive model 818.

Figure 9:
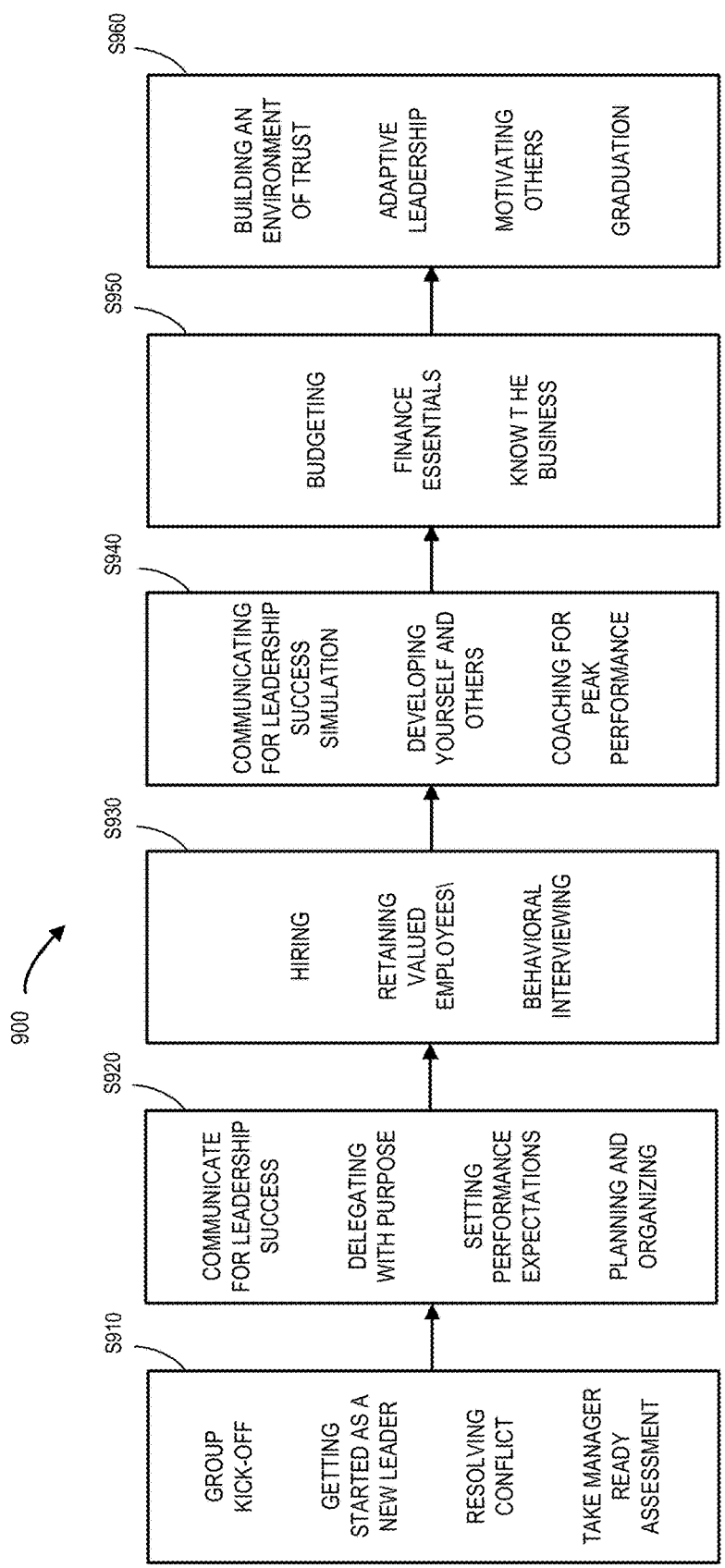
FIG. 9 illustrates an emerging leader learning journey in accordance with some embodiments described herein.

FIG. 9 illustrates an emerging leader learning journey 900 (e.g., a twelve or eighteen month training program) in accordance with some embodiments described herein. The journey 900 may begin S910 with a group kick off, a presentation about getting started as a new leader, a resolving conflict module (e.g., a self-directed e-Learning module), and an online manager ready assessment and/or simulation. The journey 900 may continue S920 with a classroom presentation about how to communicate for leadership success and/or a delegation with purpose discussion. A self-directed setting performance expectations module may then be followed by planning and organizing self-study. Note that various points in the journey 900 may encourage social media posting and written reflections by employees and/or manager/mentor checkpoints to ensure that the employee is getting the most out of the training event.

At S930, hiring and retaining valued employees self-learning modules may be followed by a behavioral interviewing module. At S940, a communicating for leadership success simulation may be run followed by developing yourself and others and coaching for peak performance classroom activities. At S950, budgeting and finance essentials self-directed learning modules may be run followed by a "know the business" online presentation led by a virtual instructor. At S960, a virtual instructor may present building an environment of trust materials followed by an adaptive leadership and a motivating others classroom activities. The journey 900 may conclude with a graduation ceremony for the employees.

Figure 10:
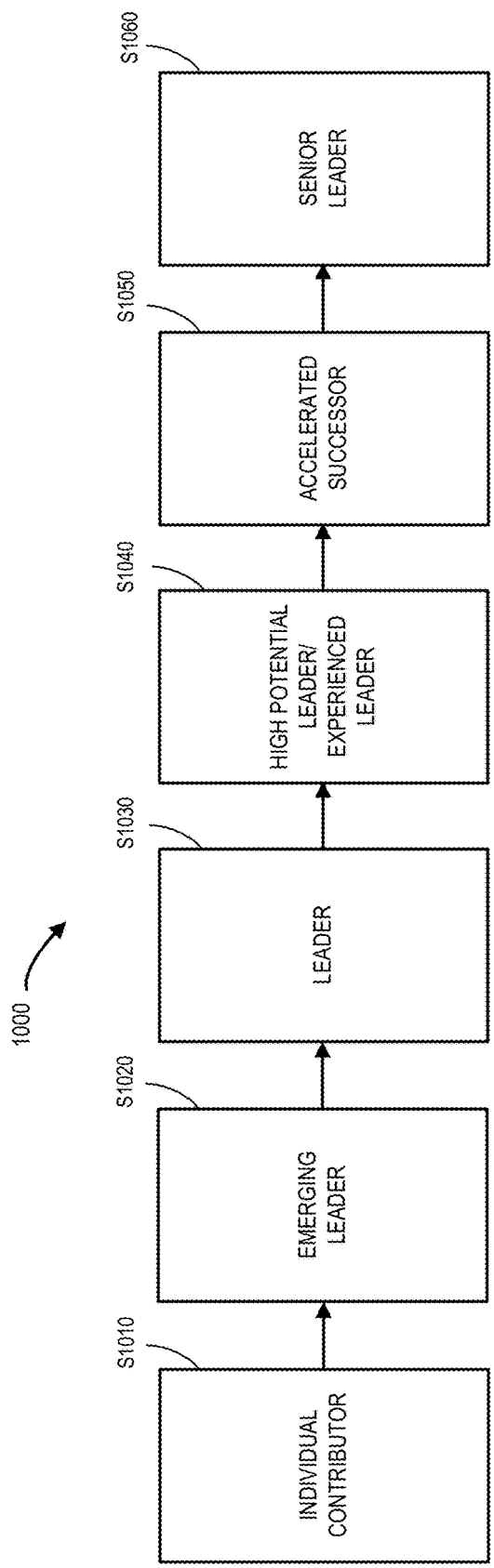
FIG. 10 illustrates a leadership path for an insurance enterprise according to some embodiments.

FIG. 10 illustrates a leadership path 1000 for an insurance enterprise according to some embodiments. The path 1000 may begin with an individual contributor S1010 (e.g., associated with a current leadership value of T9). The individual contributor S1010 may, for example, focus on time management, stress management, and work to perform effectively as a team member. The individual contributor S1010 may evolve into an emerging leader S1020 (e.g., associated with a current leadership value of T6 to T9). The emerging leader S1020, may, for example, apply emotional intelligence, develop a managerial presence, improve customer focus, and/or being to think like an owner of the enterprise. The emerging leader S1020 may evolve into a leader S1030 (e.g., associated with a current leadership value of T5 to T7). The leader S1030 may, for example, resolve team conflicts, coach and provide feedback to the team, and delegate responsibilities. The leader S1030 may evolve into a high potential leader/experienced leader S1040 (e.g., associated with a current leadership value of T5 to T6). The high potential leader/experienced leader S1040 may, for example, build partnerships, increase his or her leadership brand, and drive the importance of diversity within the enterprise. The high potential leader/experienced leader S1040 may evolve into an accelerated successor S1050 (e.g., associated with a current leadership value of T3 to T5). The accelerated successor S1050 may build an executive image, develop advanced communication skills, engage and develop a pipeline of diverse talent, etc. Finally, the accelerated successor S1050 may evolve into a senior leader S1060 (e.g., associated with a current leadership value of T2 to T4). The senior leader S1060 may, for example, lead people through change, apply prudent judgment while taking appropriate risk, and show enterprise level financial acumen.

Thus, embodiments may implement human resources applications to provide an enterprise-wide leadership development program. Embodiments may develop capable and committed owners of an enterprise that is able to clearly define what great leadership looks like consistently. Leaders may be committed owners of the enterprise, making informed decisions and taking accountability for those decisions. The employees may exemplify the values and behaviors of the enterprise and will hold their peers accountable to do the same. Leaders will develop and communicate clear visions of the future and make their employees feel valued.

To deliver capable and committed owners of the enterprise, substantial leadership development capabilities may be throughout the organization in accordance with any of the embodiments described herein. The enterprise may define the expectations of the leaders, implement metrics to monitor and track whether these are being met, and build an effective talent pipeline. Moreover, some embodiments may facilitate: a clear definition of desired leadership capabilities and behaviors that define a leader; provide a centralized leadership training program under human resources by harmonizing existing programs and eliminating shadow leadership training; build a strong pipeline of leadership talent to fill open spots; implement a leadership development program that facilitates cultural and behavioral changes (e.g., increased accountability, continuous improvement, approach to risk); establish a comprehensive leadership coaching program (e.g., master coaches in enterprise operations); and/or incorporate standardized metrics that that measure how results are achieved, and utilize those as one of the determinants of compensation.

According to some embodiments, a common leadership development program may be developed across career paths for the enterprise. The program might include, for example, multiple accelerated leadership development programs and hundreds of leadership courses aligned to enterprise's behaviors and core capabilities to build stronger leadership development capabilities throughout the organization. To support the achievement of enterprise objectives and to realize the vision of the enterprise, embodiments may provide capable and committed owners with strong leadership capabilities.

The leadership programs described herein may provide a structured approach to segment the skill sets needed by various leader levels and provide leadership development programs and/or courses to target those needs. The programs may incorporate classroom, mentoring/coaching, and/or on-the-job experience events over multiple months to engage and develop an employee as a leader at key junctures in his or her career at the enterprise. The design of each program and the overall progression from early career leader development through senior leader development, as provided by embodiments described herein, may facilitate alignment to the enterprise's identified leadership criteria and desired skills and behaviors. Moreover, embodiments may result in significant attendance and positive feedback at a reasonable price-point. Embodiments may achieved the goal of a robust offering of leadership development programs that are aligned to the objectives of the enterprise, targeted to accelerate the development of the highest potential talent, delivered in an industry-leading and fiscally responsible design.

Moreover, embodiments may: clearly define leadership capabilities and behaviors that define a leader (with skills mapped by leader level); implement leadership development programs that facilitate cultural and behavioral changes (e.g., embedded core capabilities and behaviors may be placed into program and course designs); provide accelerated leadership development programs that are multiple months in duration and target to the enterprise's high performing talent by incorporating three proven modes of instructional delivery (classroom, coaching, and on the job experiences); create processes and governance structure to facilitate ongoing management of programs, including a robust nomination process aligned to a talent review process to facilitate successor identification and high potential leader development, implement coaching throughout leadership development (with embedded assessments and active coaching through multiple accelerated leadership development programs); and/or identify measures of success, including return on investment surveys (to be administered after a sufficient population has progressed through programs).

In this way, embodiments may provide an automated and efficient way to administer an employee leadership training program. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with employee leadership training program information might be implemented as dashboard displays and/or the databases described herein may be combined or stored in external systems).

Moreover, the displays 300, 400, 500 illustrated with respect to FIGS. 3 through 5 are only provided as examples, and embodiments may be associated with any other types of user interfaces. For example, FIG. 11 illustrates a handheld social media display 1100 according to some embodiments. In this particular user display 1100, employee leadership training information 1110 may be shown to users who may, in turn, provide comments and other feedback 1120 (e.g., via a touchscreen interface).

Note that the present invention provides significant technical improvements to facilitate administration of an employee leadership training program. The present invention is directed to more than merely a computer implementation of a routine or conventional activity previously known in the industry as it significantly advances the technical efficiency, access and/or accuracy of an employee leadership training program by implementing a specific new method and system as defined herein. The present invention is a specific advancement in the areas of employee motivation and satisfaction by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, human resources and/or customer networks and subsystems. For example, in the present invention employee leadership training decisions may be analyzed accurately and automatically facilitated. Moreover, embodiments described herein may improve employee turnover rates, improve lateral moves within an enterprise, and/or generally improve the overall leadership characteristics of a business.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:
1. A system comprising:
a human resources department data storage device storing a human resources department employee database, the employee database storing information about a plurality of employees, including, for each employee, length of employment data, job title data, job description data, customer surveys, performance reviews, supervisor surveys, supervised employee surveys, a current leadership value corresponding to one of a plurality of defined leadership levels, and a business unit association;
a training department data storage device storing a training events database, the training events database storing data about a plurality of training events including, for each training event, a total number of available spots for the training event, goals data corresponding to a functional goal of the training event, and rules data corresponding to employee selection rules for the training event including at least one rule defining the current leadership value required for selection to participate in the training event;

a training program server coupled to the human resources department employee database and the training department training events database and interposed between at least one supervisor device and a plurality of employee devices, said training program server including program instructions operative to cause the training program server to:
  determine, by a business group rules engine, information about an employee leadership training event, including a first number of slots associated with a first business unit and a second number of slots associated with a second business unit, wherein a sum of the first number of slots and the second number of slots does not exceed the total number of available slots for the employee leadership training event,
  automatically select, by a first individual rules engine corresponding to the first business unit and a second individual rules engine corresponding to the second business unit, based on the information about the employee leadership training event, information in the employee database including the length of employment data, the job title data, the job description data, the customer surveys, the performance reviews, the supervisor surveys, the supervised employee surveys, current leadership values and business unit associations, and application of the goals data and rules data corresponding to the employee selection rules for the training event, a first subset of the employees in the first business unit to participate in the employee leadership training event and a second subset of employees in the second business unit to participate in the training event,
  responsive to selection of the first subset of the employees, automatically select, based on application of business logic, a third subset of employees from the first subset of the employees to determine: (i) a first group from the third subset of employees to automatically receive electronic invitations to participate in a second employee leadership training event, and (ii) a second group from the third subset of employees to be automatically enrolled in the second employee leadership training event;
  output to the at least one supervisor device a training event recommendation display which includes (i) a name of the employee leadership training event, (ii) a number of slots available for the training event, (iii) a first list of the automatically selected first subset of employees, and, (iv) a second list of recommended employees for the training event; and
  automatically transmit, via an employee portal, an electronic invitation to the employee leadership training event to each of the automatically selected first subset of employees, and an electronic invitation to the second employee leadership training event to each of the automatically selected first group of employees from the third subset of employees;
  wherein said automatic selection of said first subset of employees and said second subset of employees is based at least in part on a predictive leadership model trained with historical leadership training transaction data;
  wherein the predictive leadership model is configured to output leadership training program parameters including employee identifiers; and
  wherein the system is further configured to direct workflow based upon the leadership training program parameters.

2. The system of claim 1, wherein the program instructions are further configured to cause the training program server to automatically enroll the first and second subset of employees and the second group of the third subset of employees in the employee leadership training event, and transmit enrollment recommendations to managers of the first, second, and third subset of employees.

3. The system of claim 1, wherein selection of a first employee to be included in the first subset of employees is based at least in part on information about other employees.

4. The system of claim 1, wherein said automatic selection is further based on (i) a geographical location, (ii) an office of an enterprise, (iii) time information, (iv) a prior employee training event, (v) an employee training event request, (vi) prior training experience, (vii) potential training program conflicts, and (viii) an overall talent potential profile.

5. The system of claim 1, wherein post-employee leadership training event data is collected and used to update the predictive leadership model.

6. The system of claim 1, wherein the plurality of defined leadership levels comprise: (i) an individual contributor level, (ii) an emerging leader level, (iii) a leader level, (iv) a high potential leader level, (v) an experienced leader level, (vi) an accelerated successor level, and (vii) a senior leader level.

7. The system of claim 1, wherein the employee leadership training event is associated with at least one of: (i) a presentation, (ii) classroom based learning, (iii) a test, (iv) a coaching opportunity, (v) a mentoring program, (vi) a project-based learning opportunity, and (vii) an online simulation training module.

8. The system of claim 1, wherein the processor is further configured to:
  automatically transmit information about the first subset of employees to: (i) an email server, (ii) a workflow application, (iii) a report generator, (iv) a social media server, and (v) a calendar application.

9. A computerized method to optimize employee leadership training program enrollment selection, the method comprising:
  retrieving information from an employee database stored in a human resources data storage device, said employee database storing, for each of a plurality of employees, length of employment data, job title data, job description data, customer surveys, performance reviews, supervisor surveys, supervised employee surveys, a current leadership value corresponding to one of a plurality of defined leadership levels and a business unit association;
  retrieving information from a training events database stored in a training department data storage device, said training events database storing data about a plurality of training events including, for each training event, a total number of available spots for the training event, goals data corresponding to a functional goal of the training event and rules data corresponding to employee selection rules for the training event including at least one rule defining the current leadership value required for selection to participate in the training event;
  determining, by a business group rules engine of a training program server coupled to the employee database and the training events database and interposed between at least one supervisor device and a plurality of employee devices, information about an employee leadership training event, including a number of slots associated with a first business unit and a number of slots associated with a second business unit, wherein a sum of the first number of slots and the second number of slots does not exceed the total number of available slots for the employee leadership training event;

automatically selecting, by an individual rules engine, based on the information about the employee leadership training event and information in the employee database, including the length of employment data, the job title data, the job description data, the customer surveys, the performance reviews, the supervisor surveys, the supervised employee surveys, the current leadership values and business unit associations, and application of the goals data and rules data corresponding to the employee selection rules for the training event, a first subset of the employees to participate in the employee leadership training event;

responsive to selection of the first subset of the employees, automatically selecting, based on application of business logic, a second subset of employees from the first subset of the employees to determine: (i) a first group from the second subset of employees to automatically receive electronic invitations to participate in a second employee leadership training event, and (ii) a second group from the second subset of employees to be automatically enrolled in the second employee leadership training event; and outputting to the at least one supervisor device a training event recommendation display which includes (i) a name of the employee leadership training event, (ii) a number of slots available for the training event, (iii) a first list of the automatically selected first subset of employees, and (iv) a second list of recommended employees for the training event; and automatically transmitting, via an employee portal, an electronic invitation to the employee leadership training event to each of the automatically selected first subset of employees, and an electronic invitation to the second employee leadership training event to each of the automatically selected first group of employees from the third subset of employees;

wherein said automatic selection of said first subset of employees and said second subset of employees is based at least in part on a predictive leadership model trained with historical leadership training transaction data; and further comprising:

outputting, by the predictive leadership model, leadership training program parameters including employee identifiers; and directing workflow based upon the leadership training program parameters.

10. The method of claim 9, further comprising automatic enrolling the first subset of employees in the employee leadership training event, and transmitting enrollment recommendations to managers of the first subset of employees.

11. The method of claim 9, wherein selection of a first employee to be included in the first subset of employees is based at least in part on information about other employees.

12. The method of claim 9, wherein said automatic selection is further based on at least one of: (i) a geographical location, (ii) an office of an enterprise, and (iii) time information.

13. The method of claim 9, further comprising: automatically transmitting information about the first subset of employees to: (i) an email server, (ii) a workflow application, (iii) a report generator, (iv) a social media server, and (v) a calendar application.

14. A system to optimize employee leadership training program enrollment selection, the system comprising:

a human resources department data storage device storing an employee database, the employee database storing information about a plurality of employees, including, for each employee, a current leadership value corresponding to one of a plurality of defined leadership levels, job title data, length of employment data, job description data, customer surveys, performance reviews, supervisor surveys, and supervised employee surveys;

a training department data storage device storing a training events database, the training events database storing data about a plurality of training events including, for each training event, a total number of available spots for the training event, goals data corresponding to a functional goal of the training event and rules data corresponding to employee selection rules for the training event including at least one rule defining the current leadership value required for selection to participate in the training event;

a training program server coupled to the employee database and the training department training events database and interposed between at least one supervisor device and a plurality of employee devices, said training program server including program instructions operative to cause the training program server to:

determine, by a business group rules engine, information about an employee leadership training event, automatically select, by an individual rules engine, based on the information about the employee leadership training event and information in the employee database, including the current leadership values job titles, lengths of employment data, job description data, customer surveys, performance reviews, supervisor surveys, and supervised employee surveys, and application of the goals data and rules data corresponding to the employee selection rules for the training event, a first subset of the employees to participate in the employee leadership training event, responsive to selection of the first subset of the employees, automatically select, based on application of business logic, a second subset of employees from the first subset of the employees to determine: (i) a first group from the second subset of employees to automatically receive electronic invitations to participate in a second employee leadership training event, and (ii) a second group from the second subset of employees to be automatically enrolled in the second employee leadership training event;

output to the at least one supervisor device a training event recommendation display which includes (i) a name of the employee leadership training event, (ii) a number of slots available for the training event, (iii) a first list of the automatically selected first subset of employees, and, (iv) a second list of recommended employees for the training event; and automatically enrolling the first subset of employees in the employee leadership training event and automatically transmit, via an employee portal, an electronic invitation to the employee leadership training event to each of the automatically selected first subset of employees;

wherein said automatic selection of said first subset of employees and said second subset of employees is based at least in part on a predictive leadership model trained with historical leadership training transaction data;

wherein the predictive leadership model is configured to output leadership training program parameters including employee identifiers; and wherein the system is further configured to direct workflow based upon the leadership training program parameters.

15. The system of claim 14, wherein selection of a first employee to be included in the first subset of employees is based at least in part on information about other employees.

16. The system of claim 14, further comprising:

automatically transmitting information about the first subset of employees to: (i) an email server, (ii) a workflow application, (iii) a report generator, (iv) a social media server, and (v) a calendar application.

* * * * *